3,098,102
Patented July 16, 1963

3,098,102
PRODUCTION OF UNSATURATED ALIPHATIC ALDEHYDES
James Robert Bethell and David James Hadley, Epsom Downs, England, assignors to The Distillers Company Limited, Edinburgh, Scotland, a British company
No Drawing. Filed Jan. 25, 1960, Ser. No. 4,218
Claims priority, application Great Britain Feb. 17, 1959
4 Claims. (Cl. 260—604)

The present invention relates to the production of unsaturated aliphatic aldehydes, and in particular to the production of acrolein and methacrolein.

According to the present invention, the process for the production of acrolein or methacrolein comprises reacting at an elevated temperature in the vapour phase propylene or isobutene with oxygen over an oxidation catalyst, defined below, and recovering acrolein or methacrolein from the reaction products.

The preferred starting material is isobutene. In the case of propylene, a mixture of acrolein and acrylic acid is produced.

The catalysts used in the process of the present invention must include molybdenum, oxygen and cobalt and may be regarded either as mixtures of molybdenum oxides with cobalt oxides or as oxygen-containing compounds of molybdenum and cobalt, such as cobalt molybdate. Under the reaction conditions the catalyst may be present in both forms. The term "cobalt molybdate" as used in the appended claims is defined as (I) a mixture of the oxides of molybdenum and cobalt, and/or (II) a compound of molybdenum, cobalt and oxygen. The catalyst may include minor proportions of additional elements such as tellurium, e.g. as tellurium oxides, and may if desired be deposited on a support such as alumina or silica. The catalyst may be conveniently prepared, for example, by precipitation from mixed solutions of cobalt and molybdenum salts. It is preferred to prepare the catalyst by forming a complex of (a) cobalt oxides, (b) molybdenum oxides, and (c) ammonia or a water-soluble aliphatic amine, and subjecting the complex to a heat-treatment. The catalyst is suitably prepared, for example, by mixing an aqueous solution of a cobalt salt with an aqueous solution or suspension of molybdic acid or a molybdic acid salt, adding ammonia or a water-soluble aliphatic amine such as ethanolamine to the aqueous mixture, drying the resulting precipitate, and heating it to a temperature in the range 400° to 700° C. A variation of this method is to form an aqueous solution of a cobalt salt and ammonium molybdate, heating the mixture until a precipitate forms, drying the precipitate and subjecting it to a heat treatment as before. Another method of preparing the catalyst consists in adding ammonia or a water-soluble amine to an aqueous solution of a cobalt salt, and mixing the resulting precipitate with molybdic acid or a salt of molybdic acid with a volatile base either as such or as a solution or suspension, for instance in water, the mixture then being evaporated to dryness and subjected to heat treatment as described above.

The ratio of cobalt to molybdenum in the catalyst may vary within moderately wide limits, but it is preferred to use a molar ratio not substantially greater than 1:1.

The reaction of propylene or isobutene with oxygen over the catalyst may be carried out in any suitable manner, for instance as a fixed bed process, or as a fluidised bed process.

The proportion of olefine in the feed may vary within fairly wide limits, for example between 1 and 20% by volume. It is preferred to use between about 2 and 10% by volume of the olefine.

The concentration of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence, as diluent, of a gas which is substantially inert under the conditions of reaction, for example, nitrogen, propane, butane, isobutane, carbon dioxide and steam. It is preferred to use steam or nitrogen or mixtures thereof. The concentration of the steam may vary within wide limits, for instance between 20 and 60% by volume of the feed.

The reaction is carried out at an elevated temperature, preferably between 300 and 500° C.

The contact time may be, for example, in the range 1–30 seconds.

The unsaturated aldehyde may be recovered from the reaction products in any suitable manner, for example by countercurrent extraction with water, preferably at an acid pH, followed by fractional distillation.

The process of the invention is further illustrated with reference to the following examples, in which the parts by weight and parts by volume bear the same relation to each other as do grams to millilitres.

*Example 1*

A solution of cobalt nitrate (1300 parts by weight) in water (1340 parts by volume) was added to a solution of ammonium molybdate (790 parts by weight) in water (1000 parts by volume) and to this well stirred mixture at room temperature ammonia solution (371 parts by volume of 0.880 ammonia in 371 parts by volume of water) was added dropwise. The precipitate was collected, thoroughly washed with water and dried. The granules were then sieved to 8 to 16 mesh B.S.S. and heat-treated at 600° C. for 16 hours. The molar ratio of cobalt to molybdenum in the catalyst was 1:1.04.

A reactor containing the cobalt molybdate catalyst was contained in a liquid bath maintained at 379° C. A gaseous mixture of isobutene (10% by volume), air (50% by volume), and steam (40% by volume) was passed over the catalyst, the contact time being 4 seconds. The methacrolein was recovered from the reaction products by extraction with water, followed by fractional distillation.

Of the total isobutene fed to the reactor, 7.0% was converted to methacrolein, 10.9% to carbon dioxide and 66.1% was recovered unchanged. The yield of methacrolein based on isobutene consumed was 21%.

*Example 2*

Ammonium molybdate (176.6 parts by weight) was dissolved in 200 parts by volume of distilled water. 83 parts by volume of ammonia (specific gravity 0.880) were added to the ammonium molybdate solution at 60° C. Cobalt nitrate hexahydrate (291.1 parts by weight) was dissolved in 300 parts by volume of distilled water. The cobalt nitrate solution, at 60° C., was added slowly with stirring to the ammoniacal solution of ammonium molybdate, maintaining the temperature at about 60° C. Stirring was continued for 15 minutes after the cobalt nitrate solution had been added to the ammoniacal ammonium molybdate solution. The suspension of cobalt molybdate was allowed to stand overnight, filtered, washed with water, dried and ground to a powder.

The cobalt molybdate was then mixed with tellurium dioxide in 1:1 molar ratio by grinding. The resultant mixture was heated in air at 400° C. for 4.5 hours.

The cobalt molybdate/tellurium dioxide catalyst was placed in a reactor maintained at 383° C. A gas mixture comprising 5% by volume of propylene, 40% by volume of steam and 55% by volume of air was passed over the catalyst, the contact time being 4 seconds. The acrolein was recovered from the reaction products by extraction with water followed by fractional distillation.

55.1% of the propylene feed was converted to acrolein, 24.0% to acrylic acid and 5.4% to carbon dioxide. 10.9% of the propylene was recovered unchanged. The yield of acrolein based on propylene consumed was 62%.

*Example 3*

The process described in Example 2 was repeated except that the propylene feed was replaced with isobutene.

A gas mixture comprising 2.1% by volume of isobutene and 97.9% by volume of air was passed over the catalyst in a reactor maintained at 345° C., the contact time being 4 seconds.

Of the isobutene fed, 32.4% was converted to methacrolein, 3.5% to methacrylic acid, 19.7% to carbon dioxide and 22.1% was recovered unchanged. The yield of methacrolein based on isobutene consumed was 41.6%.

We claim:

1. The process for the production of an unsaturated aldehyde selected from the group consisting of acrolein and methacrolein which comprises reacting at about 300–500° C. in the vapour phase and in the presence of an inert gaseous diluent a substance selected from the group consisting of propylene and isobutene with oxygen, the proportion of olefine in the feed being between about 2 and 10% by volume, the proportion of oxygen in the feed between 2 and 15% by volume, over cobalt molybdate as an oxidation catalyst, and recovering the unsaturated aldehyde from the reaction products.

2. The process as claimed in claim 1 wherein the catalyst is cobalt molybdate in which the ratio of cobalt to molybdenum is not substantially greater than 1:1.

3. The process as claimed in claim 1 wherein the catalyst is prepared by forming a complex of (a) cobalt oxides, (b) molybdenum oxides and (c) a compound selected from the group consisting of ammonia and water-soluble aliphatic amines, and heating the complex to about 400–700° C.

4. The process as claimed in claim 1 wherein an inert gaseous diluent selected from the group consisting of steam, nitrogen and mixtures thereof is used.

References Cited in the file of this patent

UNITED STATES PATENTS

| | | |
|---|---|---|
| 2,627,527 | Connolly et al. | Feb. 3, 1953 |
| 2,941,007 | Callahan et al. | June 14, 1960 |
| 3,009,943 | Hadley et al. | Nov. 21, 1961 |